United States Patent [19]

Lapeyre

[11] 4,276,776
[45] Jul. 7, 1981

[54] TEMPERATURE/PRESSURE TRANSDUCER

[75] Inventor: James M. Lapeyre, New Orleans, La.

[73] Assignee: The Laitram Corporation, New Orleans, La.

[21] Appl. No.: 112,908

[22] Filed: Jan. 17, 1980

[51] Int. Cl.³ .................. G01K 5/64; G01L 7/06; G01L 9/00
[52] U.S. Cl. ............................ 73/363.7; 73/705; 73/729
[58] Field of Search ............ 73/705, 355 R, 345, 73/178 T, 178 R, 363.5, 363.7, 363.9, 729

[56] References Cited
U.S. PATENT DOCUMENTS

| | | | |
|---|---|---|---|
| 3,100,997 | 8/1963 | Lorenz | 73/705 |
| 3,119,270 | 1/1964 | Wayne | 73/705 |
| 3,159,750 | 12/1964 | Kazan | 73/705 |
| 4,166,383 | 9/1979 | Lapeyre | 73/136 A |

Primary Examiner—Donald O. Woodiel
Attorney, Agent, or Firm—Weingarten, Maxham & Schurgin

[57] ABSTRACT

A temperature or pressure gauge capable of providing a magnified output indication of a respective sensed temperature or pressure of a fluid. Overlapping surfaces are movable relative to one another in response to sensed changes in temperature or pressure of a fluid. Each surface is provided with an aperture, a light controlling edge, or an indicator which overlaps and intersects at an acute angle a respective aperture, edge or indicator on the other surface. Rotary motion or other motion induced by the sensing element is translated into linear movement of the point of intersection of the two apertures, edges or indicators, the linear movement being greater in magnitude than the movement of the sensing element. This gauge is suitable for strip chart recording, for visual observation or for electrooptical reading. Where the gauge is adapted for electrooptical reading, a light source illuminates the point of intersection and a photo sensor array produces a signal indicating the location of the point of intersection. This signal may be translated into a readout of the temperature or pressure or it may be used to activate a control mechanism.

25 Claims, 16 Drawing Figures

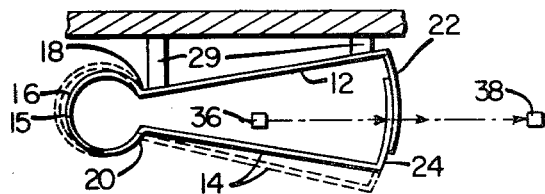
FIG. 4A
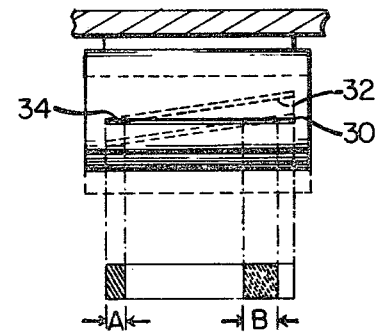
FIG. 4B
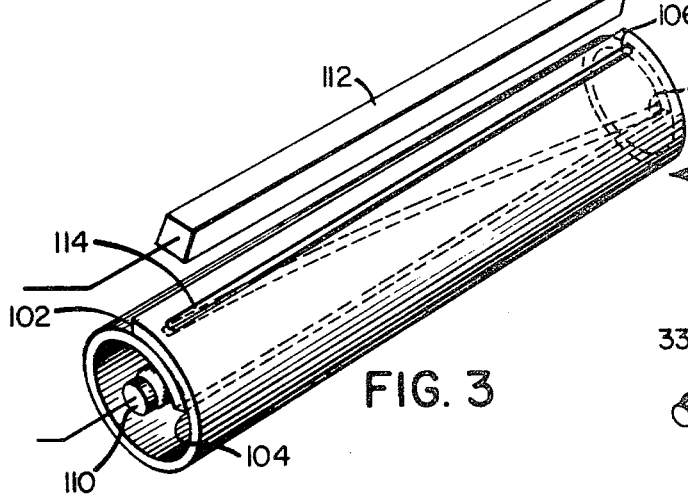
FIG. 3
FIG. 7
FIG. 6

TEMPERATURE/PRESSURE TRANSDUCER

FIELD OF THE INVENTION

This invention relates generally to temperature and pressure measurement, and more particularly to gauges which translate small temperature or pressure changes into large linear movements by the use of skewed apertures or acutely angled radiation controlling edges.

BACKGROUND OF THE INVENTION

In industrial, marine, commercial, laboratory and meteorological applications, it is often necessary to measure, read, record and transmit to remote locations readings of temperatures or pressures or variations thereof over a period of time. An instantaneous visual or electrical readout thereof may be required or, in other applications, it may be desirable to control the operation of other apparatus by the generation of an electrical or mechanical signal in response to changes in temperature or pressure. In certain well-known applications, changes in temperature or pressure induce physical motion within the sensing element, which is translated by a mechanical linkage to a needle or an indicator dial for an immediate visual readout. In other applications, rotary motion produced by a temperature or pressure sensing element is translated by a potentiometer or a shaft encoder into an electrical output signal. This signal may then be used to produce a visual readout of the temperature or pressure or it may be used to control other apparatus. In each of the above cited examples, a mechanical linkage is necessary to translate temperature or pressure variations sensed by an element into a visual mechanical movement or an electrical signal.

Electrical and visual signals have been generated directly without the use of unnecessary linkages in torque meters. Examples of these torque meters may be found in U.S. Pat. No. 4,166,383 and the prior art cited therein. Such torque meters produce a magnified output indicative of the movement of the shaft which in turn is a function of the torque applied thereto. Small movements of the shaft may be detected by relatively large movements of the axial marker provided thereon with respect to an aperture.

In many of the above-referenced applications, temperature or pressure measurements are made under conditions which require the instrument to withstand substantial vibrations, pressure pulsations, or physical impact. Most available instruments which are designed to withstand such abuses are expensive and have a heavy construction especially designed to protect the instrument against such harsh usage. Most of such temperature or pressure gauges of conventional dial and needle design are not suited to be read electrooptically. The sensitivity of such prior art devices may be increased only by increasing the size of the device itself or by amplifying the visual signal produced. If the sensing element and its attendant gauge is enlarged in order to increase the sensitivity of the gauge, it often becomes larger and heavier than desirable, and more subject to vibrations, pressure pulsations, and impact due to its large inertial masses. Such a device is often more expensive as well. If the gauge is reduced in size to overcome these problems, the mechanical or optical apparatus necessary to amplify the visual signal produced by the gauge often renders the gauge too complex and too vulnerable to damage for ordinary commercial, industrial, marine and other uses.

SUMMARY OF THE INVENTION

In accordance with the present invention, a pressure or temperature gauge is provided having a simplified construction wherein small mechanical movements of temperature or pressure sensing elements are translated into a magnified linear output by producing relative movement of overlapping surfaces having acutely angled edges or skewed apertures. Small rotary or other movement of a sensing element can be easily and readily measured by sensing the magnified linear movement of the point of intersection of the edges or apertures. This measurement may be translated into an electrical signal directly without the use of additional mechanical linkages. This invention represents an extension and expansion of the concept of magnifying small variations by the use of acutely angled edges or apertures as disclosed in U.S. Pat. No. 4,166,383.

In the present invention at least one of the overlapping surfaces is mechanically linked to the sensing element and is movable in response to changes in the temperature or pressure sensed by the element. Each of the overlapping surfaces is provided with an elongated light controlling edge, aperture, surface or line which is at an acute angle with and which crosses a corresponding light controlling edge, aperture, surface or line on the other of the overlapping surfaces. The direction of elongation of the edge, aperture, surface or line is preferably disposed transversely of the direction of movement of each of the surfaces. The edges, apertures, surfaces or lines thereby have an intersection or crossover area, and movement thereof along one of the edges, apertures, surfaces or lines provides an indication of the relative variation of temperature or pressure or of the absolute temperature or pressure, depending upon how the gauge is calibrated. The degree of sensitivity is inversely proportional to the angle formed by the intersection of the two apertures or edges, and the range of the gauge is a function of the length of the apertures, edges, surfaces or lines.

The sensor may be either a temperature sensitive bi-metal or any other temperature sensitive bi-material. A pressure sensitive bellows or Bourdon tube may be used to measure variations in pressure. In one embodiment, the overlapping surfaces comprise a pair of plates extending in an overlapping relationship from the distal end of a pair of jaws, one of the jaws being secured and the other of the jaws being movable in response to the sensing element. In another embodiment, skewed apertures, edges, surfaces or lines are formed directly on the surface of a bi-material element or upon a coiled member whose surfaces are movable in response to a bi-metallic element. In a third embodiment, the plates are disposed within a pressure sensitive bellows. A fourth embodiment shows polarized strips on transparent surfaces formed on movable cylinders.

The output indication of a temperature or pressure may be provided in the form of an electrical signal adapted for driving any suitable output indicating device, or any control mechanism, or it may be visually read. In one embodiment, skewed apertures are disposed between a photosensor array and a light source, and the photosensor array detects the location of the point of intersection of the apertures and produces an electrical signal which may be used to generate a digital readout or to activate a control mechanism. In another embodiment, a scale may be placed adjacent one of the apertures, edges, surfaces or lines so that the temperature or pressure may be read visually directly from the scale. This visual reading may be facilitated by the use of a distinctively marked edge or surface, by the relative location of one edge of a coiled bi-material element, by the position of overlapping polarized surfaces or by the location of the intersection point of two apertures. The gauge may also be adapted for continuous strip chart recording for measurement of either temperature or pressure.

The present invention permits an electrical signal to be generated directly without the use of a mechanical linkage, and this signal may be utilized to produce a visual readout of a temperature or pressure or to control the operation of an apparatus. In addition, the temperature or pressure measurement is magnified to increase the sensitivity of the gauge without increasing the size of the gauge or without using complex mechanical or optical devices. The result is suitably sized, sensitive, rugged gauge adapted to accurately measure meteorological variables or variations of temperature or pressure in controlled laboratory conditions, or in industrial, marine, commercial and other applications.

DESCRIPTION OF THE DRAWING

The invention will be more fully understood from the following detailed description taken in conjunction with the accompanying drawing, in which:

FIG. 3 is a diagrammatic pictorial view of another embodiment of the temperature gauge of this invention;

FIGS. 4a and 4b are diagrammatic view illustrating the operation of the embodiment of FIG. 1;

FIG. 6 is a cross-sectional view of a pressure gauge embodying the invention;

FIG. 7 is an exploded perspective view of another embodiment of the skewed apertures of this invention;

DETAILED DESCRIPTION OF THE INVENTION

Figure 1:
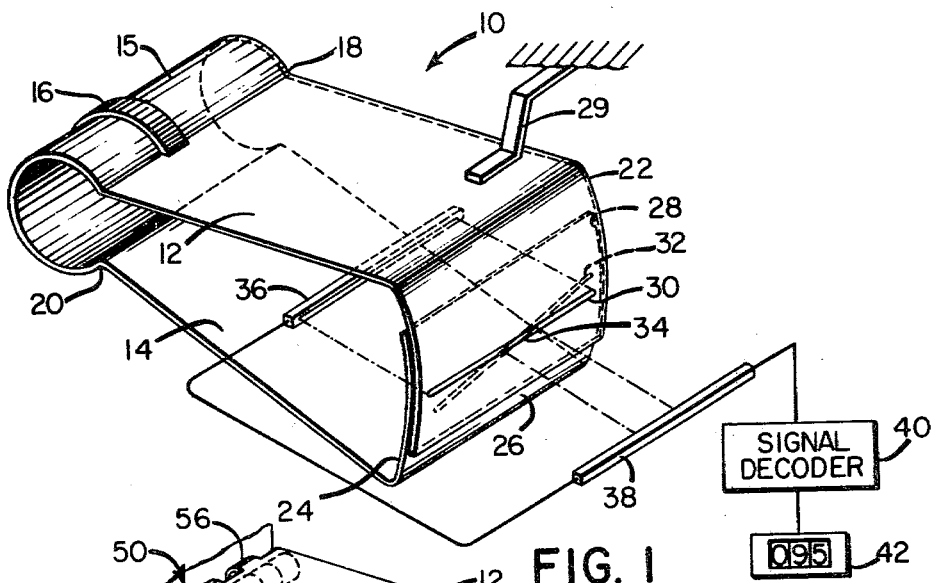
FIG. 1 is a diagrammatic pictorial view of a temperature gauge embodying the invention.

Referring now to FIG. 1, there is shown a temperature measuring gauge 10 embodying the invention. The temperature gauge 10 includes a pair of opposed jaws 12 and 14 joined by hinge 15. Hinge 15 is a coil in the form of a partial cylinder, having an elongated longitudinal gap defined by edges 18 and 20 which are spaced from one another a predetermined distance. Jaw 12 is attached to hinge 15 along edge 18 thereof, while jaw 14 is attached to hinge 15 along edge 20 thereof. Jaws 12 and 14 are preferably each planar surfaces which converge towards one another as they approach hinge 15 and which diverge as they extend away therefrom. Collar 16 may be formed from a bimetallic element which has been coiled to conform to hinge 15. Collar 16 is composed of two metals having different coefficients of thermal expansion, the interior surface of the coil being composed of one metal and the exterior surface being composed of the other metal. Gauge 10 may also be constructed so that hinge 15 is formed of a bimetallic, coiled element formed of two metals of different coefficients of thermal expansion. In such a gauge, element 16 would be unnecessary.

Jaws 12 and 14 have plates 22 and 24, respectively, which project inwardly so that inner surface 28 of plate 22 is closely adjacent and overlaps outer surface 26 of plate 24. Plate 22 is substantially perpendicular to plate 12 and projects away therefrom toward jaw 14, while plate 24 is substantially perpendicular to jaw 14 and projects away therefrom towards jaw 12. Plates 22 and 24 may have a slight radius of curvature, and preferably surface 26 does not touch surface 28. However, surfaces 26 and 28 may be in contact if they are slidable with respect to one another. Jaw 12 is preferably rendered immovable by brackets 29, as shown in FIG. 4A, while jaw 14 is permitted to move in response to element 16. Such relative motion of jaw 14 with respect to jaw 12 produces comparable relative motion of plate 24 with respect to plate 22. Alternatively, jaw 14 could be stationary and jaw 12 could be permitted to move.

Plate 22 is provided with an aperture 30 which is an elongated narrow slit extending in a longitudinal direction therealong. Plate 24 is likewise provided with an aperture 32 which may also be an elongated slit extending in a longitudinal direction therealong. Aperture 30 is preferably parallel to the cylindrical axis of hinge 15 and aperture 32 is skewed with respect to aperture 30 to form an acute angle therewith. Apertures 30 and 32 are of substantially the same length and width and are positioned to have a common point of intersection 34. Preferably, apertures 30 and 32 have a constant width along the length thereof. The location of point 34 depends upon the relative position of aperture 32 with respect to aperture 30. As jaws 12 and 14 open in response to simultaneous movement of element 16, thereby causing plate 24 to move away from jaw 12 point 34 will travel to the right, as shown in FIG. 1. When jaw 12 closes towards jaw 14, causing plate 24 to move towards jaw 12, point 34 travels to the left, as shown in FIG. 1.

The angle formed between aperture 30 and aperture 32 determines the extent to which point 34 will travel along aperture 32, for a given mechanical movement of element 16, and thereby determines the sensitivity of the temperature gauge. The length of apertures 30 and 32 determine the distance that may be traveled by point 34 and thereby determines the range of temperature variations measurable by the temperature gauge. Point 34 is preferably positioned at either the left or right end of aperture 30 when the temperature is at the lower end of the range in which it is to be measured, and point 34 is preferably at the opposite end of aperture 30 when the temperature is at the upper end of the range.

It should be noted that the acute angular relationship between apertures 30 and 32 results in a linear movement of point 34 along aperture 30 much greater in distance than the relative movement of plates 22 and 24 produced by the rotary motion induced by element 16. This configuration thus produces a magnification of the variation in temperature sensed by element 16. The degree of magnification and thus the sensitivity, is inversely proportional to the angle formed by apertures 30 and 32 and this is a function of the cotangent of the angle between apertures 30 and 32.

A light source 36 is disposed between jaws 12 and 14 and is adapted to illuminate point 34 at all times during its travel along aperture 30. A photosensor array 38 is disposed outside jaws 12 and 14 substantially co-extensively with aperture 30. Array 38 is positioned so that light emanating from source 36 and passing through point 34 operates to selectively activate the photosensors of array 38 to provide corresponding electrical signals. These electrical signals are amplified and otherwise processed in a well-known manner by a decoder 40 to provide output signals representative of the position of point 34 with respect to aperture 30 and thus an output indication of temperature. The output signal can be used to drive a suitable display 42 operative to numerically denote a temperature measurement. Alternatively, the output signal may be used to drive a control means which can be activated, deactivated, or controlled in response to the measured temperature.

The operation of this embodiment of the invention will now be described with reference to FIGS. 1, 4A and 4B. Motion is induced in jaw 14 and hinge 15 by element 16. As the temperature desired to be measured increases a certain amount, the bimetallic element 16 expands or uncoils, causing hinge 15 to do the same and causing edge 18 to move away from edge 20. Since jaw 12 is secured by brackets 29, jaw 14 and aperture 32 tend to move in a downwardly direction with respect to aperture 30 a predetermined distance, as shown in FIG. 4B, causing point 34 to move to the right, say from position A to position B. As a result, light passing through point 34 from source 36 travels along array 38 towards the right, selectively illuminating photosensors of array 38 in a progressively rightward direction. The signal produced thereby is then processed by decoder 40 which is calibrated to register on display 42 the temperature which corresponds to the location of point 34 on aperture 30.

Conversely, when the temperature drops a certain amount, the bimetallic element 16 and hinge 15 coil more tightly causing jaw 14 to move towards jaw 12 a predetermined distance, thus causing aperture 32 to move in an upward direction, as shown in FIG. 4B. Point 34 then travels to the left along aperture 30, say to the postion A, thus selectively illuminating the photosensors of array 38 in a progressively leftward direction.

Figure 2:
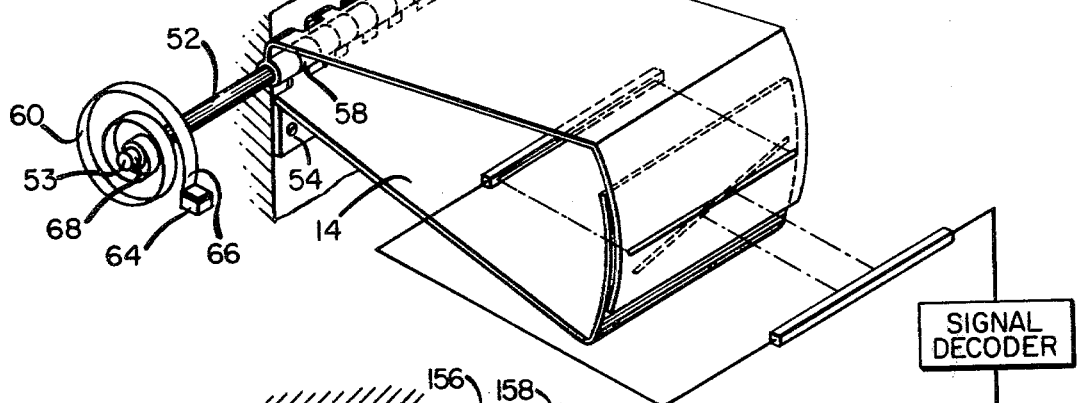
FIG. 2 is a diagrammatic pictorial view of an alternative of the temperature gauge of this invention.

An alternative embodiment of the temperature gauge as shown in FIG. 2 employs a different type of hinge 50 to join jaw 12 to jaw 14. Because of the similarities between the embodiments of FIGS. 1 and 2, like numbers will be employed for like parts where possible. Hinge 50 includes a pin 52 which passes through interlocking loops 56 and 58 formed on jaws 12 and 14, respectively. Jaw 14 has a rigid flap 54 which is secured to an immovable surface to prevent movement of jaw 14. Pin 52 extending through and is rotatable in loops 58 of jaw 14. Loops 56 of jaw 12 are secured to pin 52 so that as pin 52 pivots, jaw 12 moves in cooperation therewith. A coiled bimetallic strip 60 is attached at one end 53 to pin 52 at end 68 thereof. Strip 60 is formed of two metals of different coefficients of thermal expansion. The other end 66 of strip 60 is secured to an anchoring surface 64 to prevent movement thereof. In all other respects, the embodiment of FIG. 2 is similar to that of FIG. 1.

As the temperature desired to be measured increases a certain amount, coiled strip 60 expands and tends to unwind, producing a clock-wise rotational torque on pin 52, as viewed in FIG. 2. As the torque is applied to pin 52, the pin rotates in a clockwise direction, causing jaw 12 and plate 22, which is secured thereto, to close towards jaw 14 and plate 24 a predetermined distance. Thus, as previously described, point 34 moves to the left along aperture 30, causing light passing through point 34 to selectively activate sensors of array 38 in a progressively leftward direction. Conversely, as the temperature desired to be measured decreases a certain amount, coil 60 coils more tightly to produce a counter-clockwise torque on pin 52, which causes a counter-clockwise rotation thereof. Thus, jaw 12 and plate 22 move away from jaw 14 and plate 24 a predetermined distance into a more open position, causing aperture 30 to move away from aperture 32 and causing point 34 to move to the right in FIG. 2.

Another embodiment of the temperature gauge of the invention is shown in FIG. 3 and includes a coiled, generally cylindrical bimetallic element 100 which is comprised of metals having different coefficients of thermal expansion on opposite surfaces thereof. Element 100 has an end portion 102 which overlaps an end portion 104. Portion 104 is provided with aperture 108, while portion 102 is provided with aperture 106. Aperture 106 is preferably disposed substantially parallel to the longitudinal axis of element 100, while aperture 108 is skewed at an acute angle with respect to aperture 106 producing common point of intersection 114. Both apertures 106 and 108 have an elongated, linear shape and extend substantially along the full length of element 100. Within element 100 is disposed an elongated light source 110, substantially co-extensive with the aperture 106. An elongated sensor array 112 is disposed exteriorly of element 100, and is aligned substantially co-extensively with the aperture 106.

As the temperature increases, the element 100 uncoils, and portion 102 and aperture 106 move away from portion 104 and aperture 108. Thus, a movement of point 114 to the left is produced, as shown in FIG. 3. Light passing from source 110 through point 114 selectively activates photosensors on array 112 in a progressively leftward direction, in response to the movement of point 114, and the output signal from array 112 may be processed as previously described. As the temperature to be measured decreases, element 100 coils more tightly, causing portions 104 and 102 to move toward one another, thus producing a comparable associated movement of apertures 108 and 106. As a result, point 114 moves to the right, as shown in FIG. 3, thus selectively activating corresponding photosensors of array 112 in a progressively rightward direction to indicate a reduced temperature, as previously described.

Figure 5:
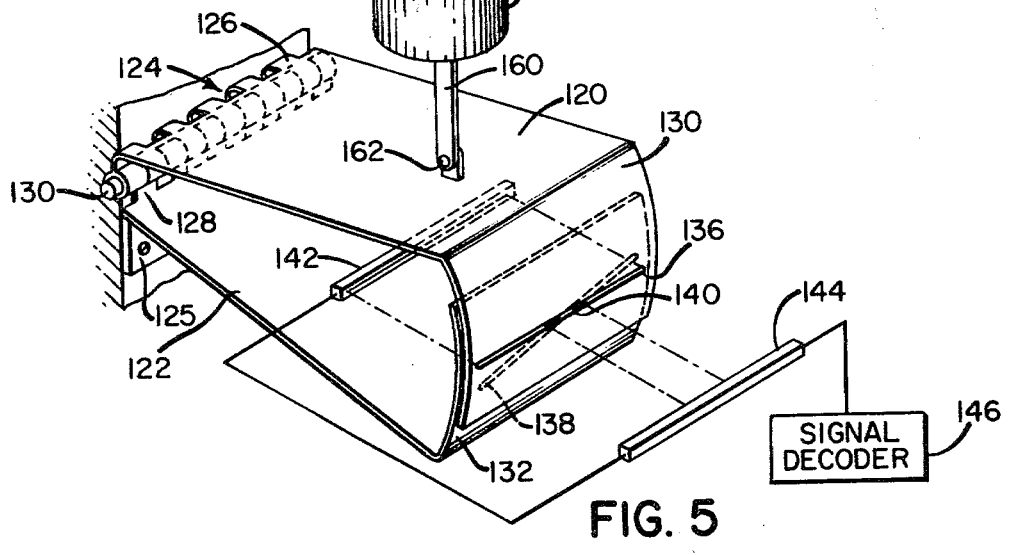
FIG. 5 is a diagrammatic pictorial view of another embodiment of the temperature gauge of this invention.

An embodiment of a pressure-measuring gauge is shown in FIG. 5. The pressure gauge is provided with two opposed jaws 120 and 122, and overlapping plates 130 and 132 secured to respective jaws 120 and 122. Jaws 120 and 122 converge toward a hinge 124 to which they are pivotally connected. Hinge 124 includes interlocking loops 126 and 128 which are associated with jaw 120 and jaw 122, respectively, and pin 130 which extends through interlocking loops 126 and 128 and permits loops 126 and 128 to rotate thereabout. Jaw 122 is secured by flap 125 to a mounting surface to prevent movement thereof. Plate 130 is provided with an aperture 136 which is aligned substantially parallel to pin 130. Plate 132 is provided with aperture 138 which is skewed with respect to aperture 136, forming an acute angle therewith. Apertures 136 and 138 are of approximately the same length, and both are substantially linear and elongated in shape. A point of intersection 140 is produced where apertures 136 and 138 cross one another.

Light source 142 is disposed between jaws 120 and 122 and aligned substantially co-extensively with aperture 136 and a photosensor array 144 is provided outside of jaws 120 and 122 such that point 140 is disposed between light sources 142 and array 144. The array 144 is aligned substantially parallel to aperture 136 and is connected to output circuit 146.

A pressure sensor 150 is provided on top of jaw 120. Sensor 150 includes portions 152 and 154 which are movable relative to one another and which are calibrated to register variations in the pressure of a gas entering sensor 150 through port 156. As the pressure of the gas to be measured increases, portions 152 and 154 move away from one another, and when the pressure of the gas to be measured decreases, portions 152 and 154 advance towards one another. Sensor 150 is secured to a fixed surface by bracket 158. Arm 160, extending from portion 154, is pivotally attached to jaw 120 by pin 162. As the pressure of the gas to be measured increases, jaw 120 is driven in a downward direction as shown in FIG. 5, and when the gas pressure decreases, jaw 120 is lifted in an upward direction. Thus as the gas pressure increases, plate 130 is driven in a downward direction with respect to plate 132, and point 140 moves in a leftward direction, as shown in FIG. 5. Conversely, as the pressure decreases, plate 130 is lifted in an upward direction with respect to plate 132 and point 140 moves to the right, as shown in FIG. 5. These movements of point 140 are detected by array 144 and an output signal is produced, as previously described. In all other respects, the operation of the embodiment shown in FIG. 5 is identical to that of the embodiment shown in FIG. 2.

Another embodiment of the pressure gauge of this invention is shown in FIG. 6. A pressure gauge is provided with opposed generally circular discs 200 and 202 which are disposed substantially parallel to one another. Flexible bellows 204 is disposed intermediate discs 202 and 200 and sealingly connected thereto. Bellows 204 is adapted to permit calibrated movement of disc 200 relative to disc 202 in response to variations in the pressure of a gas introduced through port 206 in disc 202 and into chamber 205 defined by bellows 204 and discs 200 and 202. As the pressure of the gas increases, disc 200 is urged away from disc 202 while as the pressure decreases, disc 200 is urged toward disc 202. Within chamber 205 are plates 208 and 210 which are attached to respective discs 200 and 202. Plates 208 and 210 are disposed in an overlapping, spaced relationship. Plate 208 is provided with aperture 212 immediately opposite overlapping portions of plate 210, while plate 210 is provided with aperture 214 disposed opposite overlapping portions of plate 208. Apertures 212 and 214 have an elongated shape, as previously described in the other embodiments of this invention. Aperture 214 is aligned generally parallel to disc 202, and aperture 212 is skewed with respect to aperture 214 to form an acute angle therewith so that apertures 212 and 214 have a point of intersection 220. It should be noted that aperture 212 may be parallel to disc 202 and aperture 214 may be skewed with respect thereto. An elongated light source 216 is provided within chamber 205 and is attached to plate 208 directly opposite aperture 214. Light source 216 is elongated substantially coextensively with aperture 212, and it is adapted to continuously illuminate point 220. Disposed within chamber 205 opposite aperture 214 and aligned substantially coextensively with aperture 212 is photosensor array 218. Array 218 is affixed to plate 210 to remain immovable with respect thereto and detects the position of point. Array 218 and light source 216 are situated so that plates 208 and 210 and point 220 are disposed generally intermediate thereof. The operation of the embodiment shown in FIG. 6 is similar to that of the other embodiments of FIGS. 1 through 5 of this invention and will not be further described.

FIG. 7 shows an exploded view of an alternative configuration for the apertures with is adaptable for use in each of the previously described embodiments. Plates 312 and 314 are in a closely overlapping relationship. Apertures 330 and 332 formed in plates 312 and 314 respectively are disposed between light source 336 and array 338 as shown in FIG. 7. One of the two apertures, preferably aperture 330, has a narrow, elongated shape of uniform width. The other aperture, preferably aperture 332, is in the shape of a right triangle, having one leg 331 substantially parallel to aperture 330 and of substantially the same length, and another leg 333 perpendicular thereto. Aperture 332 may be in the position shown in FIG. 7 or it may be in an inverted position. Aperture 332 is preferably situated with respect to aperture 330 such that aperture 330 is disposed adjacent leg 331 when the temperature or pressure is at one end of the range in which it is to be measured and aperture 330 is disposed adjacent end 335 of leg 333 of aperture 332 when the temperature or pressure is at the other end of the range in which it is to be measured. As the temperature or pressure changes a certain amount, causing plate 314 to move downwardly with respect to plate 312 a predetermined distance, aperture 332 moves in a downward direction with respect to aperture 330, and light emanating from source 336 toward aperture 332 passes through an increasingly greater longitudinal extent of aperture 332 to activate an increasingly greater number of photosensors in array 338. As plate 314 continues to move in a downward direction with respect to plate 312, aperture 330 is ultimately in a position where it is aligned adjacent leg 331 of aperture 332. At this point, the entire length of aperture 330 is exposed to source 336, illuminating an appropriate number of the photocells along the extent of array 338. Conversely, when the temperature or pressure changes a certain amount causing plate 314 to move upwardly away from plate 312 a predetermined distance, aperture 332 moves in an upward direction, as shown in FIG. 7. As this occurs, a progressively lesser extent of aperture 330 is illuminated, and a correspondingly progressively fewer number of photosensors in array 338 are activated. Ultimately no photosensors in array 338 are activated at all. It can be seen from the foregoing that the output signal for a certain temperature or pressure is determined not by the position of a point of intersection as in the previous embodiment, but rather by the total number of cells activated or illuminated by the light source. This signal may also be decoded as described in previous embodiments.

Figure 8:
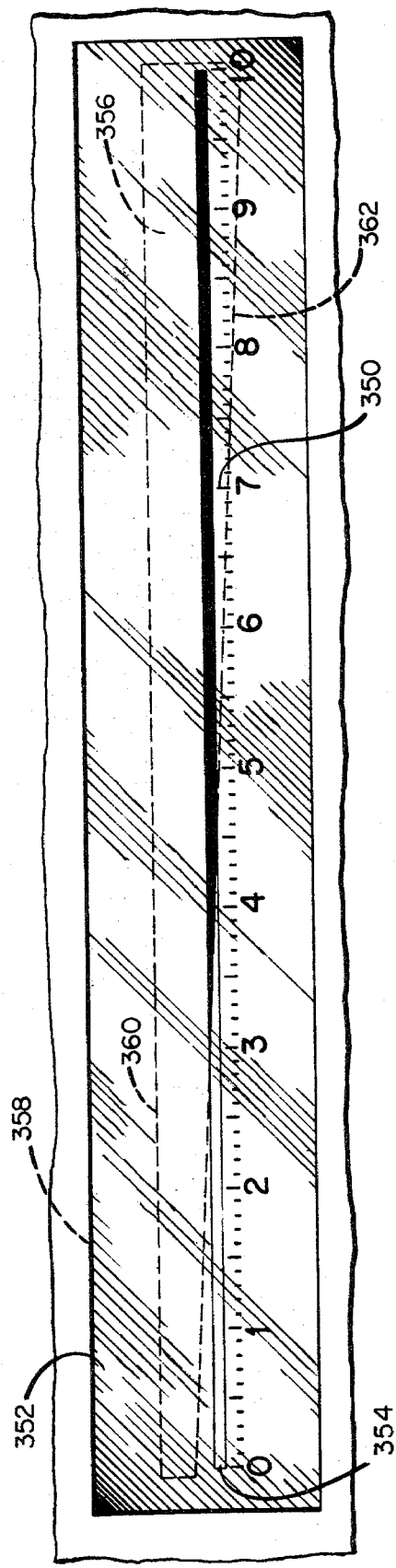
FIG. 8 is a view of another embodiment of the apertures of this invention in combination with a scale.

Referring now to FIG. 8, a visual indicator is shown which may be utilized in conjunction with any of the previously described embodiments of FIGS. 1 through 7. Also disclosed is a somewhat different aperture configuration. One aperture 354 is displayed on a surface 352 which is provided in a position visible to an observer. Aperture 354 is preferably elongated in a longitudinal direction along surface 352, and has a narrow width which is uniform along its entire length. Disposed closely adjacent aperture 354, preferably just below it, is a scale 350 which is calibrated in terms of a temperature or a pressure to be measured. Disposed on a surface 358 located behind surface 352 is another aperture 356. Aperture 356 has a longitudinal extent generally equal to that of aperture 354, and one edge 360 which is substantially parallel to aperture 354. The other edge 362 of aperture 356 is disposed at an acute angle with respect to the edges of aperture 354 so that the width of aperture 356 increases uniformly moving from left to right in FIG. 8. Surface 352 is retained in a stationary position with respect to an observer, while surface 358 is permitted to move relative to surface 352 in a direction transverse of apertures 354 and 356. A light source may be provided behind surfaces 352 and 358 so that light is emitted outwardly away from surface 352 towards an observer.

A transparent or translucent material may be used to cover aperture 354 to diffuse the light coming therethrough so that it does not shine into the eyes of an observer. This transparent or translucent material may be colored. The leftward extend of illumination of aperture 354 and thus scale 350 provides observer an instant indication of the temperature or pressure to be measured as surface 358 moves with respect to surface 352 in response to changes in temperature or pressure. Alternatively, no light source is employed, and the portion of surface 358 visible through aperture 354 may be provided with an easily visible color. The temperature or pressure is then easily read by an observer from scale 350 by the extreme rightward advance of the colored portion of surface 358. In all other respects, the operation of the embodiment of FIG. 8 is similar to that of the embodiment of FIG. 7.

Figures 9, 10:
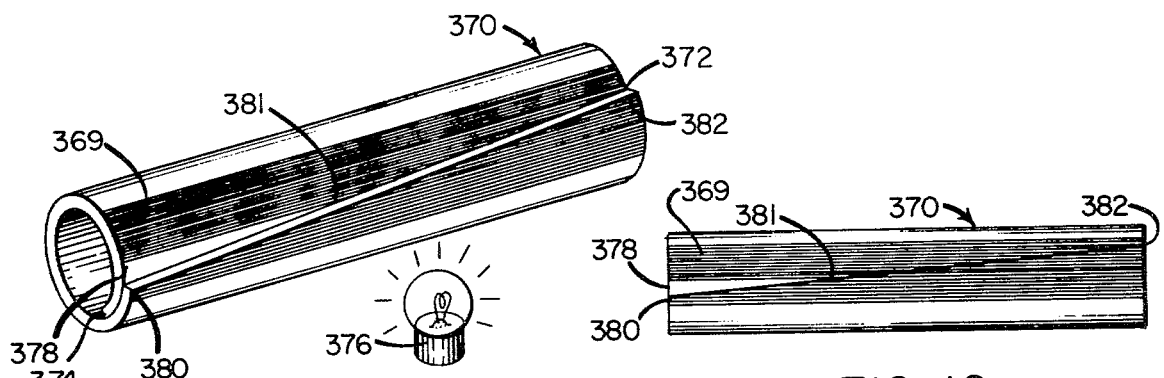
FIG. 9 is a diagrammatic pictorial view of another embodiment of the temperature gauge of this invention showing a multi-color indicator.
FIG. 10 is a front view of the temperature gauge of FIG. 9.

FIGS. 9 and 10 show an alternative embodiment of FIG. 5 of the invention. In FIGS. 9 and 10, a bimaterial tube 370 is shown, preferably a bimetallic coil, which is sensitive to changes in temperature. Edge 372 overlaps edge 374 along the entire longitudinal extend thereof. Edge 372 is disposed at an acute angle with respect to the axis of tube 370, while edge 374 is preferably disposed generally parallel to the axis of tube 370. The outer surface of tube 370 immediately adjacent edge 372 is painted a bright color or is provided with a finish such that edge 372 is clearly visible to an observer. Another similarly painted or treated strip 369 is disposed on tube 370 in a portion thereof partially overlapped by edge 372. Adjacent edge 374 is an unpainted or untreated surface of tube 370 which is clearly visible in contrast to strip 369 and to the treated or painted surface of tube 370 adjacent edge 372. The boundary line 378 between the treated or painted strip 369 and the untreated surface portion of tube 370 adjacent edge 374 is substantially parallel to edge 374 and to the axis of tube 370. Line 378 intersects edge 372 at point 381. Line 378 is positioned so that is disposed closely adjacent end 380 of edge 372 when coil 370 is in its most tightly wrapped configuration, when the temperature is at the lower end of the range to be measured and line 378 is disposed roughly adjacent end 382 of edge 372 when coil 370 is uncoiled to its furthest extent when the temperature is at the upper end of the range to be measured. The intersection point 381 may be illuminated by a lamp 376 so that it is clearly visible to an observer. A scale like that of FIG. 8 may be provided along edge 372, to give an observer an immediate indication of the temperature to be measured.

In operation, as the temperature surrounding coil 370 increases, bimetallic coil 370 expands and tends to unwind, thereby moving line 378 upwardly with respect to edge 372 and moving point 381 to the right as shown in FIG. 9. Conversely, as the temperature decreases, coil 370 tends to become more tightly wound, causing line 378 to move downwardly with respect to edge 372 and moving point 381 to the right, as shown in FIG. 9. The location of point 381 provides a direct visual reading of the temperature to be measured.

Figure 11:
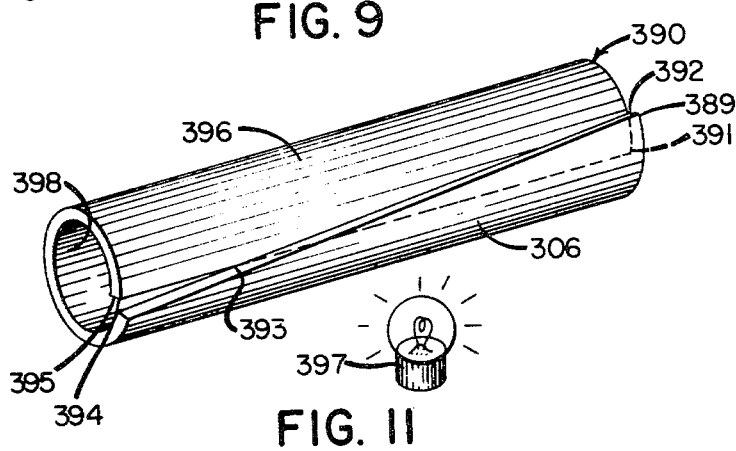
FIG. 11 is a diagrammatic view of another embodiment of the temperature gauge of this invention showing angled edges.

FIG. 11 shows another variation of the embodiment of FIGS. 9 and 10. A bimaterial or bimetallic coil 390 is provided with overlapping edges 394 and 392. Edge 394 is preferably disposed parallel to the axis of coil 390, while edge 392 is preferably disposed at an acute angle to the axis of coil 390 and thus to edge 394. Edge 394 intersects edge 392 at point 393. The exterior surface 306 of coil 390 is painted or treated in a color which contrasts with the interior surface 398 of coil 390. Edges 392 and 394 may be illuminated by lamp 397. End 395 of edge 394 is preferably disposed closely adjacent end 393 of edge 392 when the temperature is at the lower end of the range to be measured, and end 391 of edge 394 is preferably disposed closely adjacent end 389 of edge 392 when the temperature is at the upper end of the range to be measured. The position of point 393 provides an indication of temperature, and a scale similar to that shown in FIG. 8 may be provided along edge 392 give an immediate visual reading of the temperature. In operation, as the temperature increases, coil 390 tends to unwind causing edge 394 to move upwardly away from edge 392 and causing point 393 to move to the right, as shown in FIG. 11, thus exposing to view a portion of surface 398. As the temperature decreases, coil 390 tends to wind more tightly, causing edge 394 to move downwardly towards edge 392 and causing point 393 to move to the left, as shown in FIG. 11, thereby reducing the amount of surface 398 that is exposed.

It should be noted that the bimetallic cylinders or coils as illustrated in FIGS. 5, 9, 10 and 11 may be formed of any two materials which have differing coefficients of thermal expansion. Although a bimetallic element composed of invar steel and aluminum is preferred. Other possible embodiments include a coil having a ribbon of glass of a low coefficient of thermal expansion fused or movably attached to a transparent plastic material having a higher coefficient of thermal expansion. In each case, the changes in temperature may be read visually or sensed as previously indicated. A different scale would of necessity need to be used for each coil composed of different materials, and the angle formed by the apertures or edges would be adjusted depending on the range and sensitivity desired.

Figure 12:
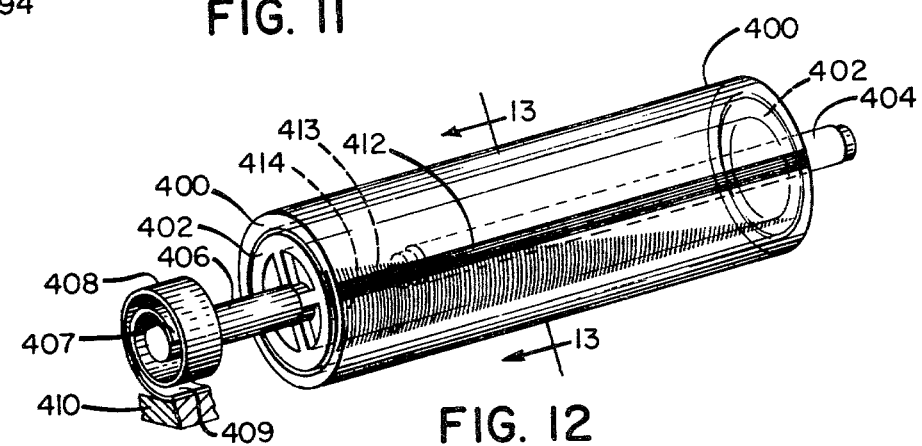
FIG. 12 is a diagrammatic pictorial view of another embodiment of the temperature gauge of this invention, utilizing a bi-material with polarized surfaces.
Figures 13, 14:
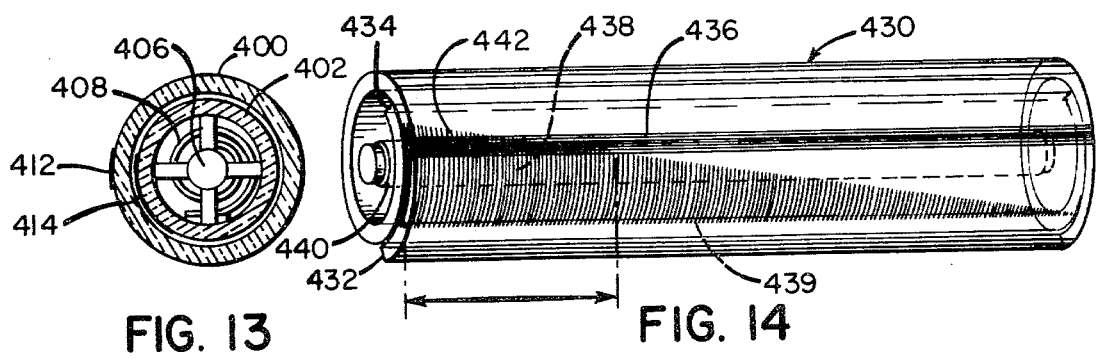
FIG. 13 is an end view of the embodiment of FIG. 12.
FIG. 14 is a perspective view of another configuration of the embodiment of FIG. 12.

Another embodiment of the invention utilizing polarized surfaces is shown in FIGS. 12 through 14. FIG. 12 shows a pair of transparent coaxially disposed cylinders 400 and 402, outer cylinder 400, surrounding an inner cylinder 402 which is rotatable with respect to cylinder 400. Cylinder 402 is secured to shaft 406, and cylinder 400 is nonrotatably mounted independently of cylinder 402. An end 407 of bimaterial element 408 which is preferably a bimetallic element is secured to one end of shaft 406, in a manner similar to that shown in FIG. 2. The other end 409 of element 408 is fixedly secured to prevent movement thereof. As bimaterial elemet 408 coils more tightly or uncoils, shaft 406 and thus inner cylinder 402 are rotated independently of cylinder 400 in response thereto. A light source or array of lights is displayed along shaft 406 within inner cylinder 402 and directs light outwardly from shaft 406 towards outer cylinder 400. Outer cylinder 400 is provided with strip 412 disposed generally parallel to shaft 406 which is composed of a polarizing material, adapted to polarize light emitted from shaft 406 in either an axial or a circumferential direction. In this embodiment, strip 412 is adapted to polarize light in an axial direction. A second strip 414 is formed on inner cylinder 402, and strip 414 is adapted to polarize light emitted from shaft 406 in a direction perpendicular to the direction of polarization of strip 412. Strip 414 preferably has the shape of a right triangle, the hypotenuse forming an acute angle with respect to strip 412, the angle being a function of the desired degree of sensitivity and the desired range. One leg of strip 414 is preferably parallel to strip 412 and the other leg is perpendicular thereof. Preferably, angle 413 of strip 414 is adjacent strip 412 when the temperature to be measured is at its lowest point and when the temperature to be measured is at its highest point, strip 414 completely overlaps strip 412. A scale (not shown) may be placed on cylinder 400 adjacent strip 412 to give an instaneous visual reading of the temperature.

The operation of the embodiment of FIGS. 12 and 13 will now be described. As the temperature to be measured increases, element 408 uncoils, thus rotating shaft 406 and cylinder 402 in a counterclockwise direction as shown in FIG. 12. Outer cylinder 400 remains stationary at all times. Strip 414 advances towards strip 412 which remains stationary, and as angle 413 of strip 414 beings to cross strip 412 at the lowest temperature to be measured, a portion of strip 414 overlaps strip 412. This completely polarized portion produces a shadow effect or dark strip which advances from the left towards the right in FIG. 12 along strip 412 as shaft 406 continues to rotate in a counterclockwise direction, until strip 412 is adjacent the parallel leg of strip 414 when the maximum temperature to be measured is reached. The extent of the darkened or polarized portion of strip 412 permits a visual reading of the temperature from the scale. Conversely, as the temperature decreases, shaft 406 and thus inner cylinder 402 is rotated in clockwise direction, rotating strip 414 away from strip 412 and reducing the area of overlap. The darkened area then retreats from the right towards the left until the minimum temperature to be measured is reached at which no part of strip 412 overlaps strip 414. In all other respects, the functioning of the apertures of this embodiment is similar to that of the embodiment of FIG. 7.

In FIGS. 2 and 12 where a bimetallic strip is utilized to rotate a shaft in response to a temperature change, a Bourdon tube may be substituted therefor to rotate the shaft in response to changes in pressure. The Bourdon tube is merely a coiled tube having a fluid therein which causes the tube to coil or uncoil in response to changes in pressure, in a manner similar to a bimetallic element.

In all other respects, this configuration of FIGS. 2 and 12 is as previously described, except that changes in pressure are measured rather than changes in temperature.

Referring now to FIG. 14, another embodiment of the invention is shown having a coiled transparent bimaterial cylinder 430. Cylinder 430 may be composed of any two elements which are transparent and which have differing coefficients of thermal expansion. A preferred embodiment discloses a bimaterial cylinder formed of a ribbon of glass of a low coefficient of thermal expansion on the external surface of cylinder 430, and a transparent plastic material fused to the glass on the interior surface of cylinder 430. Cylinder 430 is coiled about itself so that end 432 overlaps another end 434 and is disposed exteriorly of end 434. End 432 is coated with or provided with a strip 436 of polarizing material which polarizes light in a first direction, preferably axially. Strip 436 is substantially parallel to the axis of cylinder 430. End 434 is provided with a triangularly shaped strip 438, a lower edge 439 being generally parallel to strip 436. Strip 438 is provided with a material to polarize light in a direction perpendicular to the direction in which strip 436 polarizes light, preferably circumferentially in the embodiment of FIG. 14. Disposed within cylinder 430 is a light source 440 which is adapted to illuminate the interior of cylinder 430 and strips 436 and 438. A scale may be placed on end 432 parallel to strip 436 to permit an instantaneous visual reading of the temperature to be measured. Preferably, end 442 of strip 438 is disposed adjacent strip 436 when the temperature to be measured is at its lowest point and when the temperature to be measured is at its highest point, strip 438 completely overlaps strip 436. In operation, the temperature may be visually determined by the position of the leading edge of the dark or completely polarized portion of strip 436, as described for the embodiment of FIGS. 12 and 13. Strip 438 of FIG. 14 and strip 414 of FIGS. 12 and 13 need not have a triangular shape. Strips 438 and 414 may have any other shape wherein the width thereof increases uniformly from one axial end to the other axial end, such as that of aperture 356 of FIG. 8.

Figure 15:
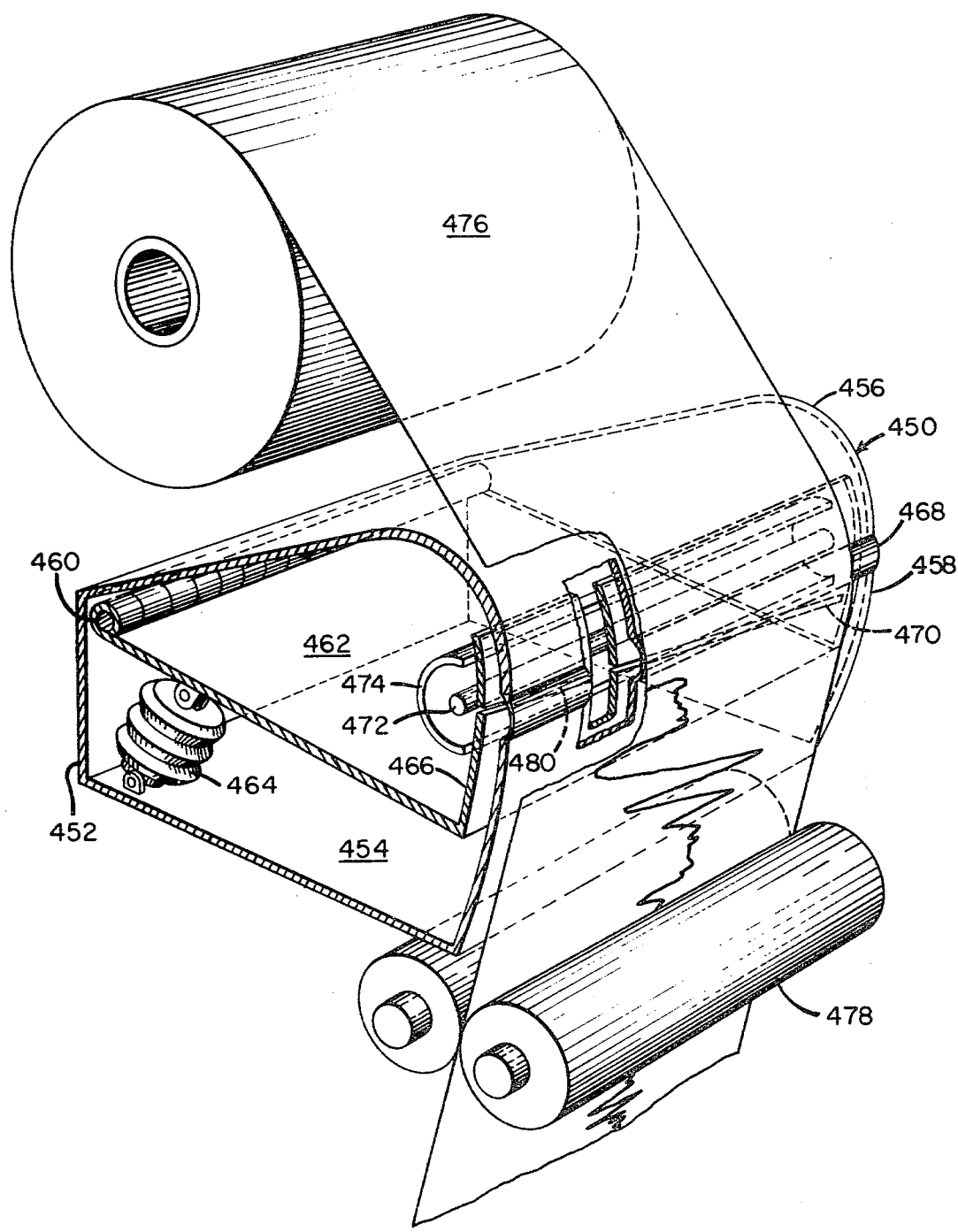
FIG. 15 is a diagrammatic pictorial view of another embodiment of this invention showing a strip chart recorder mechanism.

Another embodiment suitable for strip chart recording is shown in FIG. 15. The gauge includes a structure 450 having a back wall 452, a bottom wall 454, an upper wall 456 and a front wall 458. Upper wall 456 is preferably curved to meet front wall 458 so that wall 456 and 458 merge together to form one continuous curved surface. The junctions between wall 452 and 454, wall 452 and 456, and wall 454 and 458 may be discontinuous. Mounted to wall 452 near its intersection with wall 456 is a hinge 460, secured to which is a jaw 462 which extends towards wall 458 and substantially parallel to wall 454. Extending upwardly from jaw 462 is a plate 466 which is substantially parallel to wall 458. Disposed between jaw 462 and wall 454 is a bellows 464 which is sensitive to changes in a pressure to be measured. Bellow 464 serves to support jaw 462 and maintain a separation between it and wall 454. Bellows 464 is adapted to expand upon increase in the pressure to be measured, thereby raising jaw 462 and plate 466, and to contract upon a decrease in pressure, thereby lowering jaw 462 and plate 466. It should be noted, that a bimetallic element or some other temperature sensitive instrument may be used in conjunction with jaw 462 in place of bellows 464 to cause a movement thereof in response to changes in temperature. Such an element would be preferably attached to hinge 460 to cause movement of jaw 462 as shown in the embodiment of FIG. 2.

Wall 458 is provided with a transparent elongated window 468 which is disposed substantially parallel to hinge 460 and jaw 462. Window 468, in the preferred embodiment, has a uniform width and a length which extends across the entire lateral extent of wall 458. Plate 466 is provided with an aperture 470 which is disposed at an acute angle with respect to window 468. Aperture 470 also preferably has a uniform width and extends across the entire lateral extent of plate 466. A light source is provided behind plate 466 within enclosure 450 and between upper wall 456 and jaw 462. Light source 472 is preferably aligned substantially coextensive with window 468. Behind light source 472 is reflector 474 which serves to focus light emanating from light source 472 towards window 468. Window 468 and aperture 470 are so disposed that they have a common point of intersection 480 within the range of temperatures or pressures desired to be measured. As previously described for other embodiments, light from light source 472 is permitted to pass only through this point of intersection 480 and is visible through window 468.

A coil of heat sensitive paper 476 is provided, and the heat sensitive paper 476 is drawn past point 480 and window 468 by rollers 478. Light passing through point 480 strikes the surface of paper 476 as it moves past window 468, and the heat thereof makes a mark on the paper thus providing a trace of the temperature or pressure as a function of time. Paper 476 may also be a light sensitive paper, so that the light from light source 472 functions to provide the temperature or pressure trace as a function of time. The backside of plate 466 which is exposed to the energy radiated by light source 472 acts as a heat sink absorbing radiation not passing through point 480 and providing the necessary cooling. This is accomplished by coating the backside of plate 466 facing light source 472 with a black heat-absorbing material. The interior of walls 456 and 458 may be provided with a heat and light reflective material, such as chrome, so that the only area through which radiation energy is permitted to pass is point 480. The movement of jaw 462 and thus plate 466 with respect to wall 458 provides a linear movement of point 480 along window 466 is as described in the previous embodiments of this invention. This recording gauge is particularly immune to vibrations and other disruptions, since the only movement, other than the oscillation of jaw 462 up and down, is the movement of paper past window 468. Thus, rapid changes or pulsations in the pressure or temperature to be measured are recorded without stylus error due to the inertia thereof or without error due to vibrations transmitted to the stylus. The light source 472 may either be an ordinary light or a fine incandescent wire which radiates thermal and light energy.

The size of each embodiment of this invention is dependent upon the function to be performed, the degree of sensitivity required, and the desired range of measurement. The embodiments of this invention are preferably of a size suitable for installation in common electrical component systems, or for any other marine, industrial or commercial applications.

The invention is not to be limited except as indicated in the appended claims.

What is claimed is:

1. An optical gauge comprising:
   a sensing element adapted to produce movement in response to changes in a selected one of a fluid temperature and pressure to be measured;
   a first surface having an indication means disposed thereon, said indication means being elongated in a longitudinal dimension;
   a second surface movable relative to said first surface in a direction transverse of said longitudinal dimension, and having a second longitudinally elongated, indication means disposed thereon, said second surface and said first surface being in a confronting, overlapping relationship, said second indication means being disposed at an acute angle with respect to said first indication means and having a common point of intersection with said first indication means, the position of said point of intersection being indicative of a measurement of said selected one of a fluid temperature and pressure; and
   linkage means connecting said second surface with said sensing element and adapted to cause transverse movement of said second surface relative to said first surface in response to movement of said sensing element to produce longitudinal movement of said common point of intersection.

2. The optical gauge of claim 1 wherein said first indication means and said second indication means comprise overlapping light controlling edges, and wherein said first and second surfaces are opaque to light.

3. The optical gauge of claim 2 wherein said first indication means and said second indication means comprise apertures formed respectively in said first and said second surfaces, each of said apertures having a uniform width along its entire length.

4. The optical gauge of claim 2 wherein said first indication means comprises a substantially linearly disposed aperture of uniform width and said second indication means comprises an aperture having a width which increases uniformly along its length from one end thereof to the other end thereof.

5. The optical gauge of claim 3 further comprising:
   a light source adapted to illuminate said point of intersection on one side thereof and disposed adjacent a selected one of said first surface and second surface; and
   an array of photoelectric cells disposed adjacent the other of said first surface and second surface and adapted to detect said point of intersection by means of light passing therethrough from said light source and to produce an electric current in response thereto.

6. The optical gauge of claim 4 further comprising:
   a light source adapted to illuminate said point of intersection on one side thereof and disposed adjacent a selected one of said first surface and said second surface; and
   an array of photoelectric cells disposed adjacent the other of said first surface and said second surface and adapted to detect said point of intersection by means of light passing therethrough from said light source and to produce an electric current in response thereto.

7. The optical gauge of claim 2 wherein said first indication means and said second indication means comprise edges formed on respectively on said first and second surfaces.

8. The optical gauge of claim 1 wherein said first and said second surfaces are light transmissive, and wherein said first indicator means comprises a linear strip of light polarizing material adapted to polarize light in one direction and said second indicator means comprises a second strip of light polarizing material adapted to polarize light in a direction perpendicular of said one direction.

9. The optical gauge of claim 8 wherein said second strip of light polarizing material has a width which remains constant along its longitudinal length.

10. The optical gauge of claim 8 wherein said second strip has a triangular shape.

11. The optical gauge of claim 9 or 10 further comprising a light source disposed adjacent said first and said second strips and adapted to illuminate said first and said second strips in a direction generally perpendicular to said first and said second surfaces.

12. The optical gauge of claim 1 wherein said first indicator means comprises an edge formed on said first surface and wherein said second indicator means comprises a linear demarcation formed on said second surface.

13. The optical gauge of claim 11 wherein said linkage means comprises a shaft and wherein said second surface comprises a cylinder formed of a light transparent material and fixedly secured to said shaft for rotation therewith and wherein said first surface comprises a second cylinder composed of a light transparent material and non-rotatably mounted exteriorly of said first cylinder and coaxially therewith.

14. The optical gauge of claim 11 wherein said sensing element comprises a coiled transparent bimaterial cylinder coiled about itself at least once, said cylinder being formed of two different materials of different coefficients of thermal expansion, and wherein said first surface and said second surface are disposed on overlapping portions of said cylinder.

15. The optical gauge of any one of claims 5, 6, 7 or 12 wherein said sensing element comprises a coiled bimetallic cylinder formed of two metals of different thermal coefficients of thermal expansion and wherein said first surface and said second surface are disposed on overlapping portions of said bimetallic cylinder.

16. The optical gauge of claim 5 or 6 and further comprising a pair of spaced jaws pivotable relative to one another in response to said sensing element, one of said jaws being connected to said first surface and the other of said jaws being connected to said second surface.

17. The optical gauge of claim 16 wherein said sensing element comprises a bimetallic coil formed substantially in the shape of a cylinder and having a gap in its surface extending longitudinally generally parallel to the axis of said coil, said gap being definedly a first longitudinal coil edge spaced from a second longitudinal coil edge, a distance between said first edge and said second edge increasing as an ambient temperature increase and distance decreasing as said ambient temperature decreases.

18. The optical gauge of claim 17 wherein an edge of said one jaw is secured to said first coil edge and an edge of said other jaw adjacent said one jaw edge is secured to said second coil edge and wherein said coil is disposed intermediate said first jaw and said second jaw, said one jaw edge and said other jaw edge being generally parallel to said first surface and said second surface and spaced therefrom.

19. The optical gauge of claim 16 further comprising:
hinge means interconnecting an edge of said one jaw and an adjacent edge of said other jaw and permitting said one jaw to pivot with respect to said other jaw in response to movement of said sensing element; and
means for immovably securing said other jaw.

20. The optical gauge of claim 19 wherein said sensing element comprises a temperature sensitive bimetallic element formed as a band wrapped around an exterior surface of said hinge means.

21. The optical gauge of claim 19 wherein said sensing element comprises a pressure-sensitive bellows means having a piston movable in response to changes in a pressure to be measured; and wherein said linkage means comprises a piston arm connecting said piston and said other jaw.

22. The optical gauge of claim 5 or 6 wherein said sensing element comprises a pressure sensitive bellows means, said bellows means comprising:
a first plate;
a second plate movable relative to said first plate;
a flexible, impermeable curtain disposed between said first plate and said second plate and sealingly secured to said first plate and said second plate to create a chamber therebetween, said curtain being operable to maintain said first plate at a predetermined spaced distance from said second plate under ambient conditions; and
means allowing fluid communication between a fluid to be measured and said chamber;
said curtain allowing the distance between said first plate and second plate to vary in response to changes in pressure to the fluid to be measured.

23. The optical gauge of claim 22 wherein said first surface is secured to said first plate and said second surface is secured to said second plate and wherein said first surface, said second surface, said array and said light source are disposed within said chamber.

24. The optical gauge of claim 5 further comprising:
window means covering said aperture formed in said first surface;
reflector means adjacent said light source for direction light therefrom toward said aperture in said first surface, said reflector and light source means being disposed adjacent said second surface on a side thereof opposite that of a said first surface;
means for conducting heat sensitive paper past said second surface and said aperture formed therein at a predetermined speed.

25. The optical gauge of any one of claims 1, 3, 4 or 7 further comprising a selected one of a temperature and a pressure scale disposed on said first surface adjacent said first indication means.

* * * * *